US005566920A

United States Patent [19]

Romann et al.

[11] Patent Number: 5,566,920

[45] Date of Patent: Oct. 22, 1996

[54] VALVE NEEDLE FOR AN ELECTROMAGNETICALLY ACTUABLE VALVE AND METHOD FOR MANUFACTURING THE VALVE NEEDLE

[75] Inventors: Peter Romann, Stuttgart; Ferdinand Reiter, Markgroeningen; Martin Maier, Moeglingen; Thomas Naeger, Stuttgart, all of Germany

[73] Assignee: Robert Bosch GmbH, Stuttgart, Germany

[21] Appl. No.: 240,704

[22] PCT Filed: Aug. 20, 1993

[86] PCT No.: PCT/DE93/00759

§ 371 Date: May 11, 1994

§ 102(e) Date: May 11, 1994

[87] PCT Pub. No.: WO94/07024

PCT Pub. Date: Mar. 31, 1994

[30] Foreign Application Priority Data

Sep. 11, 1992 [DE] Germany .......................... 42 30 376.1

[51] Int. Cl.$^{6}$ ............................ F16K 31/06; F02M 51/06

[52] U.S. Cl. ................................ 251/129.21; 251/129.15; 239/585.4

[58] Field of Search ......................... 251/129.21, 129.15; 239/585.1, 585.4, 585.5

[56] References Cited

U.S. PATENT DOCUMENTS

| | | | |
|---|---|---|---|
| 5,002,727 | 3/1991 | Okimoto et al. | 148/105 X |
| 5,170,987 | 12/1992 | Krauss et al. | 251/129.21 |

FOREIGN PATENT DOCUMENTS

| | | |
|---|---|---|
| 1277677 | 11/1989 | Japan . |
| 3191002 | 8/1991 | Japan . |
| 4180504 | 6/1992 | Japan . |

*Primary Examiner*—Kevin Lee
*Attorney, Agent, or Firm*—Edwin E. Greigg; Ronald E. Griegg

[57] ABSTRACT

A valve needle suitable for injection valves for fuel injection systems of internal combustion engines. The new valve needle includes a tubular actuation part, an armature section and a valve sleeve section and is manufactured by injection moulding and subsequent sintered according to a metal injection moulding method. Subsequently, the actuation part is connected to a valve closing element section by means of a weld connection such that the valve needle is manufactured in a simple and cost-effective manner.

14 Claims, 4 Drawing Sheets

VALVE NEEDLE FOR AN ELECTROMAGNETICALLY ACTUABLE VALVE AND METHOD FOR MANUFACTURING THE VALVE NEEDLE

PRIOR ART

The invention is based on a valve needle for an electromagnetically actuable valve and on a method for manufacturing a valve needle as set forth hereinafter. The German Offenlegungschrift DE-A 40 08 675 discloses a valve needle for an electromagnetically actuable valve which consists of an armature section, a valve closing element section and a valve sleeve section which connects the armature section to the valve closing element section. The armature section is connected to one end of the valve sleeve section by means of a first weld connection and the valve closing element section is connected to the other end of the valve sleeve section by means of a second weld connection. In order to manufacture the valve needle, two welding processes are therefore required, which lead to a relatively costly and expensive production of the valve needle. Additionally, there is the risk that, during the manufacture of the second weld connection between the valve closing element section and the tubular valve sleeve section, weld spatter formations are produced which become deposited on the inner wall of the tubular valve sleeve section and impair the functioning of the valve.

ADVANTAGES OF THE INVENTION

The valve needle according to the invention and the method according to the invention have, in comparison, the advantage that such a valve needle can be manufactured in a simple and cost-effective manner. The composition of the metal powder used can be simply adjusted here to give rise to optimum magnet properties of the armature section. The presence of sulphur and carbon which can have a disadvantageous effect on the quality of a weld between a valve closing element section and valve sleeve section which can be easily avoided.

By means of the measures specified in the herein, advantageous further developments and improvements of the valve needle and of the method are possible.

It is particularly advantageous if the longitudinal opening of the valve sleeve section has a partition near to its end facing the valve closing element section. In this way, a cavity is formed between the partition and the valve closing element section, in which cavity weld spatter formations, which are produced during the manufacturing of the weld connection between the valve closing element section and the valve sleeve section, are enclosed and cannot impair the functioning of the valve.

For good removal from the moulds used during the manufacture, it is advantageous if the valve sleeve section tapers starting from the armature section in the direction of the valve closing element section.

In order to reduce the weight of the valve needle, it is advantageous if recesses which extend in the direction of the longitudinal axis of the valve are formed in the wall of the longitudinal opening of the valve sleeve section so that the flow through the longitudinal opening of the valve sleeve section is not impaired.

The direct formation of a floor at the end of the valve sleeve section facing the valve closing element section also provides the advantage of keeping weld spatter formations out of the interior of the valve sleeve section.

A particularly advantageous design of the valve needle is produced then if it is manufactured with the armature section, the valve sleeve section and the valve closing element section as a preform according to the metal injection moulding method.

It is advantageous if a plastic binding agent is used as a binding agent and that this binding agent is removed from this preformby means of a thermal treatment of the preform. In this way, a particularly simple manufacture of a preform which forms the valve needle or the actuation part that already has a high degree of structural sealing is made possible.

It is particularly advantageous if the preform is hot-isostatically pressed after the sintering so that a particularly sealed structure of the valve needle and of the actuation part consisting of armature section and the valve sleeve section is obtained.

DRAWING

Exemplary embodiments of the invention are illustrated in simplified form in the drawings and explained in greater detail in the subsequent description. FIG. 1 shows a fuel injection valve with a valve needle according to the invention in accordance with a first exemplary embodiment; FIG. 2 shows the valve needle in accordance with the first exemplary embodiment; FIG. 3 shows a valve needle according to a second exemplary embodiment according to the invention; FIG. 4 shows a third exemplary embodiment of a valve needle according to the invention; FIG. 5 shows a fourth exemplary embodiment of a valve needle according to the invention; FIG. 6 shows a manufacturing method, according to the invention, for a valve needle; FIG. 7 is an exemplary embodiment formed by a fuel injection valve including a valve needle in accordance with the embodiment of FIG. 3.

DESCRIPTION OF THE EXEMPLARY EMBODIMENTS

Figure 1:
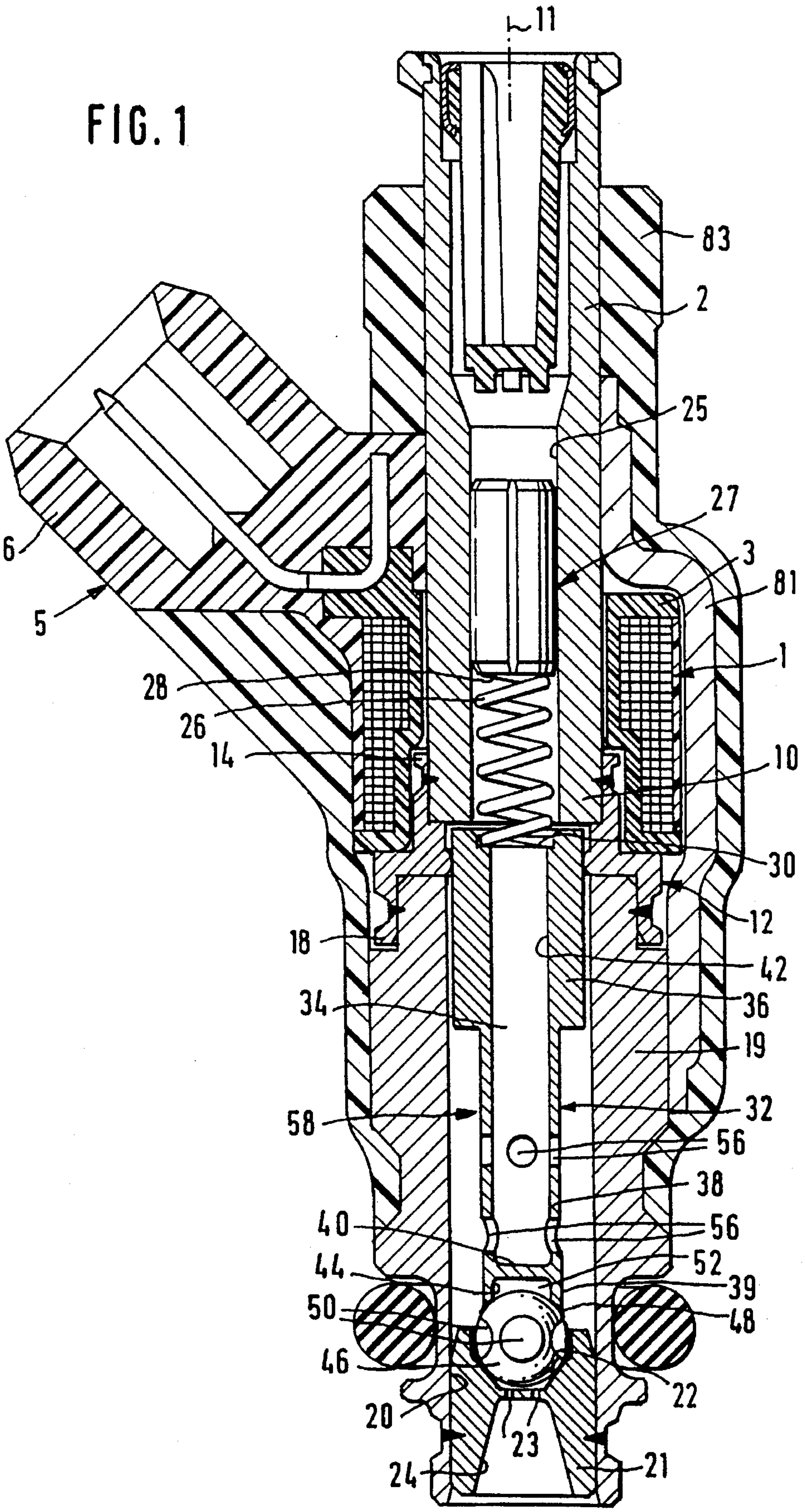

The electromagnetically actuable valve (illustrated by way of example in FIG. 1) in the form of an injection valve for fuel injection systems of mixture-compressing, spark-ignition internal combustion engines has a core 2 which is surrounded by a magnet coil 1 and serves as fuel inlet connecting element. The magnet coil 1 with a coil former 3 is provided with a plastic injection-moulded encapsulation 5, at the same time an electric connection plug 6 is also injection-moulded.

A tubular, metal intermediate part 12 is connected, for example by welding, in a sealed fashion to the lower core end 10 of the core 2 concentrically with respect to a longitudinal axis 11 of the valve and at the same time engages partially axially, with an upper cylinder section 14, over the core end 10. The coil former 3 engages partially over the core 2 and over the upper cylinder section 14 of the intermediate part 12. The intermediate part 12 is provided at its end facing away from the core 2 with a lower cylinder section 18 which engages over a tubular jet carrier 19 and is connected thereto in a sealed fashion, for example by welding. A cylindrical valve seat element 21 is mounted in a sealed fashion, by welding, into the downstream end of the jet carrier 19 in a through-hole 20 which extends concentrically with respect to the longitudinal axis 11 of the valve. The valve seat element 21 has a fixed valve seat 22 facing the magnet coil 1, downstream of the valve seat 22, in the valve seat body 21, for example two spray-off openings 23 are formed. Downstream of the spray-off openings 23, the valve seat element 21 has a preparation bore 24 which widens in the shape of a truncated cone in the direction of flow.

In order to adjust the spring force of a restoring spring 26, a tubular adjustment bushing 27 is pressed into a stepped flow hole 25 of the core 2, which flow hole 25 extends concentrically with respect to the longitudinal axis 11 of the valve. The restoring spring 26 lies with its one end on a lower end side 28, facing the valve seat element 21, of the adjustment bushing 27. The press-in depth of adjustment bushing 27 into the flow hole 25 of the core 2 determines the spring force of the restoring spring 26 and thus also influences the dynamic quantity of fuel output during the opening travel and closing travel of the valve. With its end facing away from the adjustment bushing 27, the restoring spring 26 is supported on a holding shoulder 30 of a tubular actuation part 32 which is arranged, for example, concentrically with respect to the longitudinal axis 11 of the valve. The actuation part 32 has a longitudinal opening 34 which, facing the core 2, merges into the holding shoulder 30.

Figure 2:
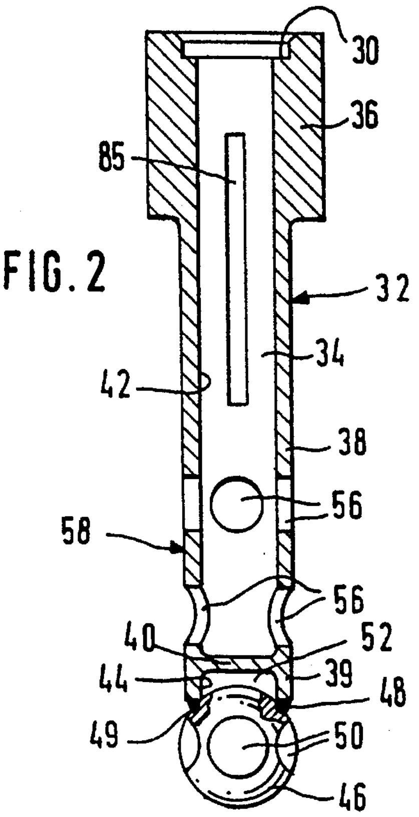

A valve needle 58 in accordance with the first exemplary embodiment illustrated in FIG. 1 is also shown in FIG. 2.

The tubular actuation part 32 consists of an armature section 36 which is of tubular construction, faces the core 2 and interacts with the core 2 and the magnet coil 1 and a tubular valve sleeve section 38 which extends facing the valve seat element 21. Near to its end 39 facing away from the armature section 35, a partition 40 is formed in the longitudinal opening 34 of the actuation part 32. The partition 40 divides the longitudinal opening 34 of the actuation part 32 into a blind hole-shaped flow section 42 which faces the core 2 and forms an extension of the flow hole 25 of the core 2 and a blind-hole section 44 which has only a small axial extent in comparison with the flow section 42. At the end 39 of the valve sleeve section 38, the actuation part 32 is connected to a, for example spherical, valve closing element section 46 by means of a weld connection 48. In order to achieve the best possible connection and a precise centering of the spherical valve closing element section 46 with respect to the actuation part 32, the valve sleeve section 38 of the actuation part 32 has at its end 39 facing away from the securing shoulder 30 an end-side bearing face 49 (see FIG. 2) formed for example in the shape of a hemisphere. Valve sleeve section 38 and valve closing element section 46 usually have a smaller diameter than the armature section 36. The, for example, spherical valve closing element section 46 has at its circumference for example four flattened portions 50 which facilitate the flowing of the fuel in the direction of the valve seat 22 of the valve seat element 21. Between the partition 40 of the blind-hole section 44 and the valve closing element section 46, a cavity 52 is formed in which the weld spatter formations arising during the manufacture of the weld connection 48, collection for example by means of laser welding. These weld spatter formations cannot escape from the cavity 52 and cannot pass for example to the valve seat 22 so that the function of the valve is not disturbed.

In the direction of the longitudinal axis 11 of the valve between the armature section 36 and the partition 40 of the actuation part 32, a plurality of through-openings 56 which pass through the wall of the valve sleeve section 38 is provided. These through-openings 56 permit the fuel to flow through the flow hole 25 of the core 2 and the longitudinal opening 34 of the actuation part 32 in the direction of the valve seat 22 of the valve seat element 21.

Figure 6:
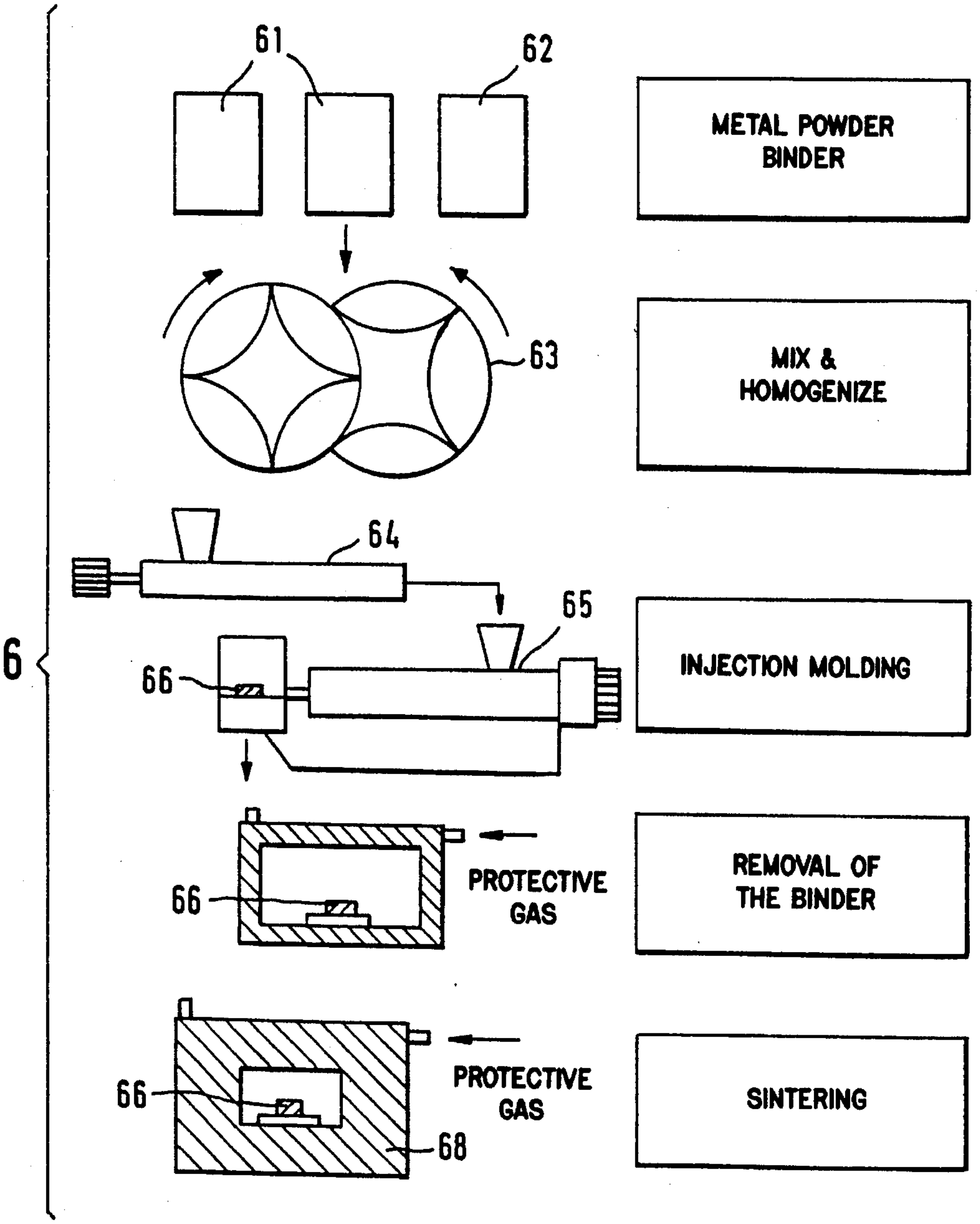

The actuation part 32, consisting of the armature section 36 and the valve sleeve section 38, and, if appropriate, also the valve closing element section 46 of the valve needle 58 are manufactured by injection moulding and subsequent sintering. FIG. 6 shows in a simplified way the method according to the invention for manufacturing a valve needle. The method which is also designated metal injection moulding (MIM) comprises the manufacturing of preforms from a metal powder with a binding agent, for example a plastic binding agent, for example on conventional plastic injection moulding machines, and the subsequent removal of the binding agent and sintering of the remaining metal powder framework. The composition of the metal powder can be easily adjusted here to give rise to optimum magnet properties of the actuation part 32 consisting of the armature section 36 and the valve sleeve section 38 or of the valve closing element section 46. Sulphur and/or carbon in the metal powder which have a negative effect on a possible weld connection 48 between valve element closing section 46 and valve sleeve section 38 can be avoided. Initially, the metal powder 61 is mixed and homogenized with the plastic used as a binding agent 62 in a mixing device 63. This mixture is then processed in a granulating device 64 to form a granulate and further processed in a manner known per se by means of a plastic injection moulding machine 65 to form a preform 66. From the injection moulded preform 66, the components of the plastic binding agent 62 are subsequently removed by thermal treatment, for example, under the influence of inert gas. The remaining material framework of the preform 66 consists of approximately 60 volume percent of metal. In order to increase the density of the preform 66, the preform is sintered in a sintering device 68 for example under the influence of inert gas. The sintering process can, however, also be performed under the influence of hydrogen or in a vacuum. If required, the preform 66 can then also be subsequently compressed by hot-isostatic pressing in order to reduce the proportion of pores in the structure of the actuation part 32 or of the valve needle 58 to approximately 1%.

Finally, in the exemplary embodiments of the valve needles according to FIGS. 1 to 4, the actuation part 32 which is obtained in this way and consists of the armature section 36 and the valve sleeve section 38 is permanently connected to the valve closing element section 46, for example by means of a weld connection 48.

The magnet coil 1 is at least partially surrounded by at least one conducting element 81 which is constructed for example as a bow and serves as a ferromagnetic element and bears with its one end on the core 2 and with its other end on the jet carrier 19 and is connected to the latter for example by welding or soldering. Part of the valve is enclosed by a plastic casing 83 which extends from the core 2 in the axial direction over the magnet coil 1 with connection plug 6 and the at least one conducting element 81.

Figure 3:
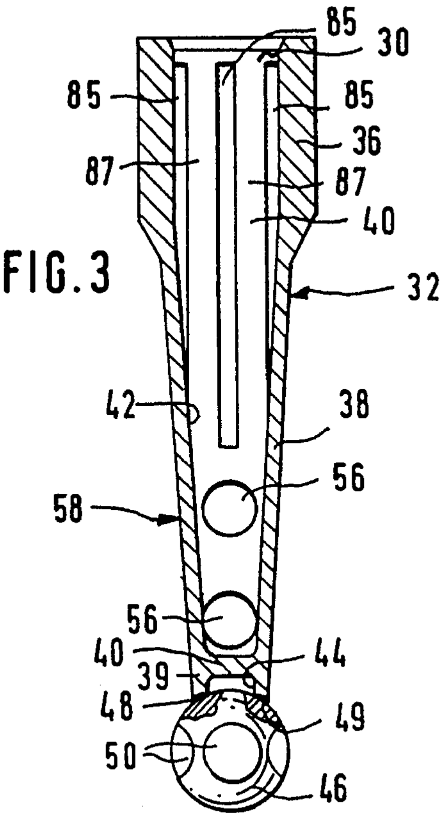
Figure 4:
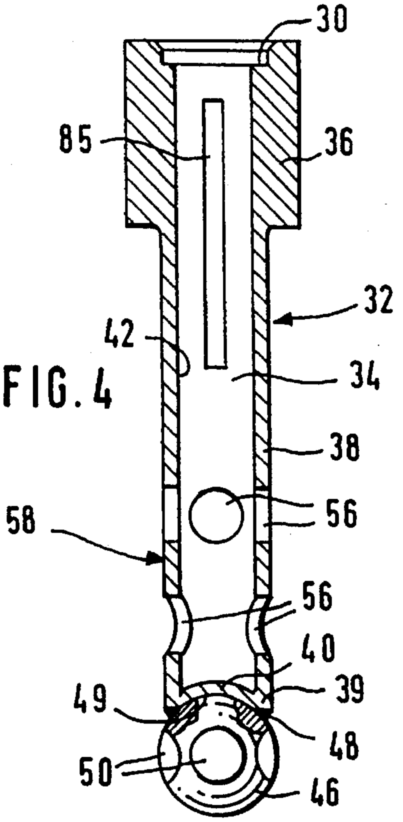
Figure 7:
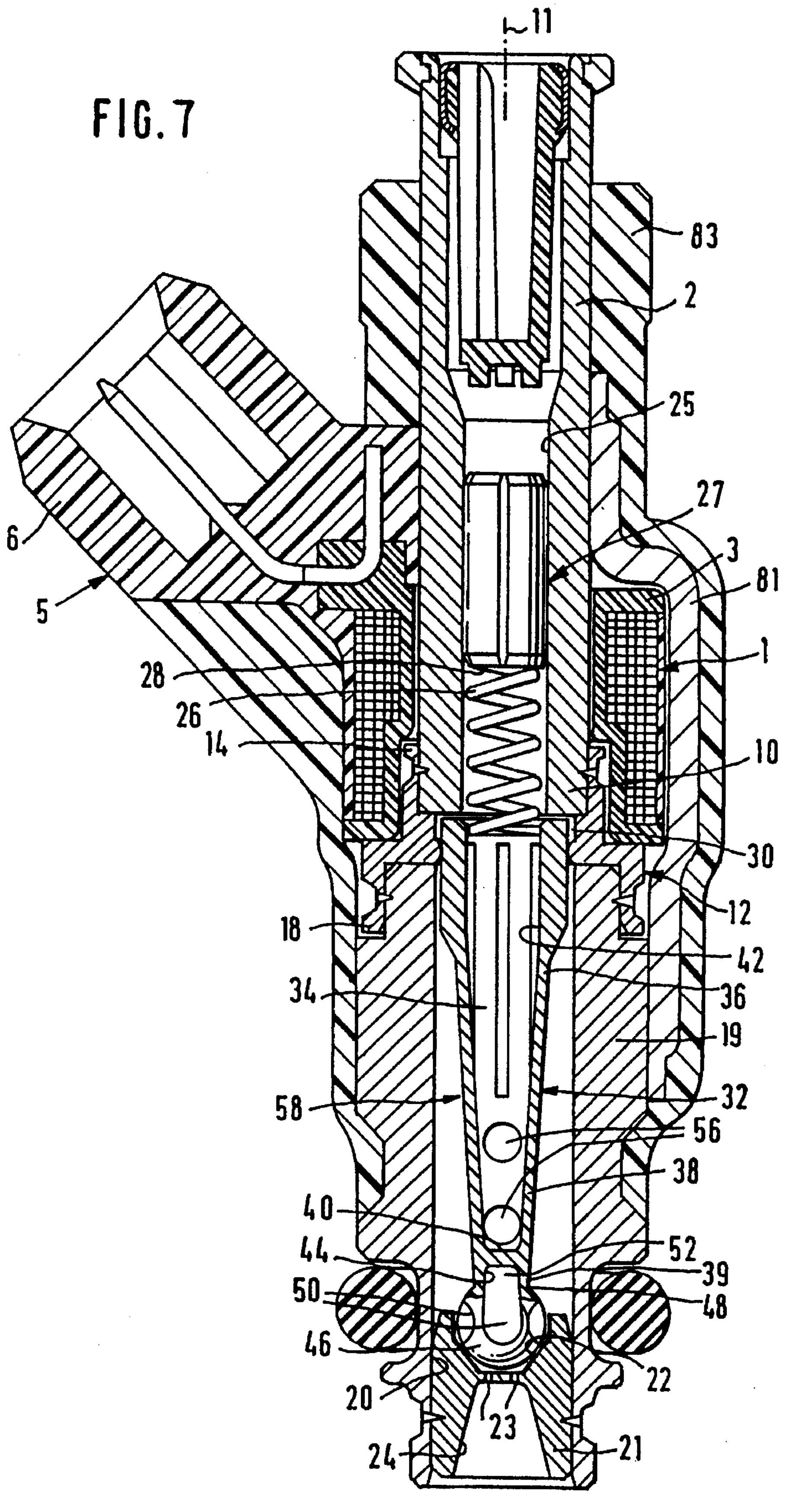

FIGS. 3 and 7 shows a second exemplary embodiment of a valve needle 58 according to the invention. The valve needle 58 consists of the actuation part 32 and the valve closing element section 46 which is connected by means of a weld connection 48 to the bearing surface 49 of the end 39 of the actuation part. The actuation part 32 has, facing away from the valve closing element section 46, the armature section 36 and the valve sleeve section 38 extending between armature section 36 and the valve closing element section 46. The actuation part 32 is constructed in such a way that the valve sleeve section 38 tapers starting from the armature section 36 in the direction of the valve closing element section 46 in the shape of a truncated cone. This conical shape of the valve sleeve section 38 facilitates the removal of the actuation part 32 from the tools to be used for its manufacture, for example from a mould of the plastic injection moulding machine 65 or the sintering device 68. In the longitudinal opening 34 of the actuation part 32, for example four recesses 85, which extend in the direction of the longitudinal axis 11 of the valve, are formed, which recesses 85 make possible a reduction in the weight of the valve needle 58 without its mechanical strength being put at risk. In this way, webs 87, which point inwards in the radial direction, are constructed on the wall of the longitudinal opening 34 of the actuation part 32 between in each case two recesses 85, which webs 87 together form, with their end facing away from the valve closing element 46, the securing shoulder 30 for the restoring spring 26.

Otherwise, the valve needle 58 in accordance with the second exemplary embodiment illustrated in FIG. 3 does not differ substantially from the first exemplary embodiment illustrated in FIG. 2.

The third exemplary embodiment of a valve needle 58 (in accordance with FIG. 4) according to the invention is distinguished from the first exemplary embodiment in accordance with FIGS. 1 and 2 solely by virtue of the fact that the partition 40 directly forms the end 39 lying opposite the armature section 36, of the actuation part 32 and is of conical construction corresponding approximately to the contour of the valve closing element section 46 which is of spherical shape. The valve closing element section 46 bears on the partition 40 and is connected thereto by means of the weld connection 48. The cavity 52 of the previous exemplary embodiment is not present in the third exemplary embodiment.

Figure 5:
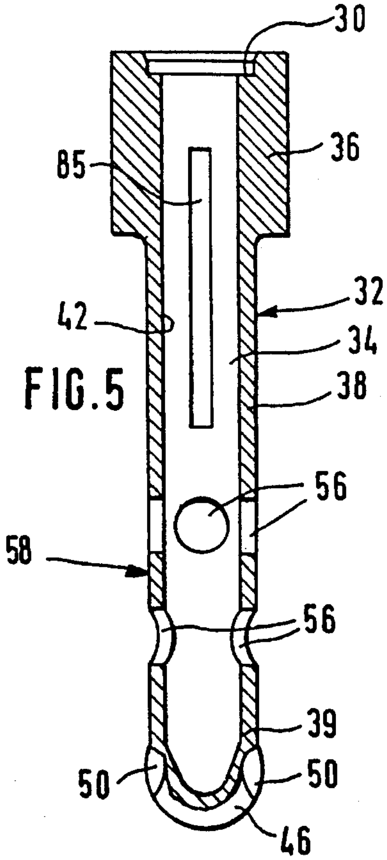

In the fourth exemplary embodiment of a valve needle 58 according to the invention and in accordance with FIG. 5, the armature section 36, the valve sleeve section 38 and the valve closing element section 46 are manufactured as one part according to MIM method described above. Here, the longitudinal opening 34 extends advantageously into the valve closing element section 46. Weld connections are not present in the fourth exemplary embodiment in accordance with FIG. 5.

The new valve needle with an actuation part 32 which is manufactured by injection moulding and subsequent sintering and consists of armature section 36 and valve sleeve section 38 or with the valve closing element section 46 which is also produced at the same time has the advantage of a very simple and cost-effective manufacture in which the welding process between armature section 36 and valve sleeve section 38 and, if appropriate, also between valve sleeve section 38 and valve closing element section 46 is dispensed with. The cavity 52, which is formed by the blind-hole section 44 of the longitudinal opening 34 of the actuation part 32 and the valve closing element section 46, leads to weld spatter formations, which arise with the design provided in the exemplary embodiments in accordance with FIGS. 1 to 4, of the weld connection 48 between valve closing element section 46 and the end 39 of the actuation part 32, remaining in the cavity 52 and not being able to disturb the function of the valve.

The foregoing relates to a preferred exemplary embodiment of the invention, it being understood that other variants and embodiments thereof are possible within the spirit and scope of the invention, the latter being defined by the appended claims.

We claim:

1. A valve needle for an electromagnetically actuable valve for an injection valve for fuel injection systems of internal combustion engines, said valve has a core, a magnet coil and a fixed valve seat with which the valve needle interacts, said valve needle (58) comprises an armature section (36), a valve sleeve section (38) and a valve closing element section (46), the valve sleeve section connects the armature section to the valve closing element section and a longitudinal opening extends through the armature section and the valve sleeve section, the armature section (36), the valve sleeve section (38) and the valve closing element section (46) of the valve needle (58) are formed as one part by injection moulding and subsequently sintered.

2. A valve needle according to claim 1, in which the longitudinal opening (34) includes a partition near an end (39), facing the valve closing element section (46), of the valve sleeve section (38).

3. A valve needle according to claim 1, in which the valve sleeve section (38) tapers starting from the armature section (36) in a direction of the valve closing element section (46).

4. A valve needle according to claim 1, in which recesses (85) which extend in a direction of a longitudinal axis (11) of the valve are formed in a wall of the valve sleeve section (38) of the valve needle ( 58 ).

5. A method for manufacturing a one-piece valve needle comprising an armature section (36), a valve closing element section (39), a valve sleeve section (38), and a valve closing element (46) connected to the valve closing element section, the method steps comprising mixing a metal powder with a binding agent and homogenizing said mixture with one another by a metal injection moulding method, forming a preform (66) which comprises said armature section (36), said valve sleeve section (38) and said valve closing element section (46) by injection moulding, removing the binding agent from the preform (66), and sintering the preform (66).

6. A method according to claim 5, in which a plastic is used as a binding agent.

7. A method according to claim 5, in which the binding agent is removed from the preform (66) by means of a thermal treatment of the said preform (66).

8. A valve needle for an electromagnetically actuable valve for an injection valve for fuel injection systems of internal combustion engines, said valve has a core, a magnet coil and a fixed valve seat with which the valve needle interacts, said valve needle (58) comprises an armature section (36), a valve sleeve section (38) and a valve closing element section (46), the valve sleeve section connects the armature section to the valve closing element section and a longitudinal opening extends through the armature section and the valve sleeve section, at least the armature section (36), the valve sleeve section (348) and the valve closing element section (46) of the valve needle (58) are formed as one part by injection moulding and subsequently sintered, and the valve sleeve section (38) tapers starting from the armature section (36) in a direction of the valve closing element section (46).

9. A valve needle according to claim 8, in which recesses (85) which extend in a direction of a longitudinal axis (11) of the valve are formed in a wall of the valve sleeve section (38) of the valve needle (58).

10. A valve needle according to claim 8, in which a partition (40) is provided at an end (39), facing the valve closing element section (46), of the valve sleeve section (38).

11. A valve needle according to claim 8, in which the valve closing element section (46) is connected by means of a weld connection (48) to the end (39) of the valve sleeve section (38) facing away from the armature section (36).

12. A valve needle for an electromagnetically actuable valve for an injection valve for fuel injection systems of internal combustion engines, said valve has a core, a magnet coil and a fixed valve seat with which the valve needle interacts, said valve needle (58) comprises an armature section (36), a valve sleeve section (38) and a valve closing element section (46), the valve sleeve section connects the armature section to the valve closing element section and a longitudinal opening extends through the armature section and the valve sleeve section, at least the armature section (36), the valve sleeve section (348) and the valve closing element section (46) of the valve needle (58) are formed as one part by injection moulding and subsequently sintered, and recesses (85) which extend in a direction of a longitudinal axis (11) of the valve are formed in a wall of the valve sleeve section (38) of the valve needle (58).

13. A valve needle according to claim 12, in which a partition (40) is provided at an end (39), facing the valve closing element section (46), of the valve sleeve section (38).

14. A valve needle according to claim 12, in which the valve closing element section (46) is connected by means of a weld connection (48) to the end (39) of the valve sleeve section (38) facing away from the armature section (36).

* * * * *